(12) United States Patent
Kim et al.

(10) Patent No.: US 12,485,540 B2
(45) Date of Patent: Dec. 2, 2025

(54) APPARATUS FOR AND METHOD OF SIMULATING ROBOT ARM MOTION PLANNING, TO WHICH CURRICULUM-BASED DEEP REINFORCEMENT LEARNING APPLIES

(71) Applicant: Korea University of Technology and Education Industry—University Cooperation Foundation, Cheonan-si (KR)

(72) Inventors: Won Tae Kim, Cheonan-si (KR); Deun Sol Cho, Cheonan-si (KR); Jae Min Cho, Cheonan-si (KR); Min Cheol Lee, Cheonan-si (KR)

(73) Assignees: Korea University of Technology and, Cheonan-si (KR); Education Industry-University Cooperation Foundation, Cheonan-si (KR)

( * ) Notice: Subject to any disclaimer, the term of this patent is extended or adjusted under 35 U.S.C. 154(b) by 242 days.

(21) Appl. No.: 18/398,849

(22) Filed: Dec. 28, 2023

(65) Prior Publication Data
US 2025/0196348 A1    Jun. 19, 2025

(30) Foreign Application Priority Data
Dec. 18, 2023   (KR) .......................... 10-2023-0184616

(51) Int. Cl.
*B25J 9/16*    (2006.01)
*G05B 19/4155*    (2006.01)

(52) U.S. Cl.
CPC ............. *B25J 9/1664* (2013.01); *B25J 9/163* (2013.01); *B25J 9/1671* (2013.01); *G05B 19/4155* (2013.01); *G05B 2219/40269* (2013.01); *G05B 2219/40321* (2013.01)

(58) Field of Classification Search
CPC ........ B25J 9/1664; B25J 9/163; B25J 9/1671; G05B 19/4155; G05B 2219/40269; G05B 2219/40321; G06N 3/092
See application file for complete search history.

(56) References Cited

FOREIGN PATENT DOCUMENTS

CN    116460860 A  *  7/2023 ............. B25J 9/163

OTHER PUBLICATIONS

CN 116460860 A English Translation (Year: 2023).*

* cited by examiner

*Primary Examiner* — Basil T. Jos
(74) *Attorney, Agent, or Firm* — STIP Law Group, LLC

(57) ABSTRACT

A method of simulating robot arm motion planning to which curriculum-based deep reinforcement learning applies may be provided. The method according to an embodiment of the present disclosure may include: generating multiple features for each target point within a robot arm's work area; deciding on a selected feature based on correlations between the multiple features; determining a level of difficulty of the each target point based on the selected feature; determining a unit of curriculum (UoC), which is a group of the targets points, for which deep reinforcement learning is to be performed in the same episode, based on the determined level of difficulty; and performing sequentially the deep reinforcement learning for each of the units of curriculum.

9 Claims, 10 Drawing Sheets

FIG. 4

| X | Y | Z | run_time | distance | delta |
|---|---|---|---|---|---|
| 0.2281 | 0.3245 | 0.5361 | 1.4227 | 0.489 | 285.8687 |
| 0.1935 | 0.0561 | 0.7781 | 1.0232 | 0.1533 | 123.2114 |
| -0.2203 | -0.0606 | 0.7317 | 0.7561 | 0.3276 | 318.0468 |
| 0.1545 | -0.1626 | 0.7485 | 0.5849 | 0.1321 | 70.7339 |
| -0.1525 | -0.334 | 0.5821 | 0.8899 | 0.4353 | 270.8069 |
| -0.0696 | 0.0968 | 0.7303 | 1.4016 | 0.2425 | 443.5825 |
| 0.0076 | 0.0117 | 0.8381 | 0.4046 | 0.1189 | 229.0934 |
| -0.3785 | 0.2122 | 0.4508 | 1.1102 | 0.6553 | 498.427 |
| -0.0951 | -0.3829 | 0.5696 | 0.8462 | 0.4461 | 246.4695 |
| -0.0411 | 0.1302 | 0.8181 | 0.2749 | 0.2356 | 157.7509 |

APPARATUS FOR AND METHOD OF SIMULATING ROBOT ARM MOTION PLANNING, TO WHICH CURRICULUM-BASED DEEP REINFORCEMENT LEARNING APPLIES

CROSS-REFERENCE TO RELATED APPLICATIONS

This application claims the priority of the Korean Patent Applications NO 10-2023-0184616, filed on Dec. 18, 2023, in the Korean Intellectual Property Office. The entire disclosures of all these applications are hereby incorporated by reference.

BACKGROUND

1. Technical Field

The present disclosure relates to a method of simulating robot arm motion planning using curriculum-based deep reinforcement learning, and more particularly, to an apparatus for and a method of analyzing multiple features, determining a curriculum, and learning robot arm motion planning simulation that utilizes deep reinforcement learning based on the determined curriculum applies.

2. Related Art

Robot arm motion planning refers to a process of determining the order and extent of motion that is required to be generated in order for a robot arm to reach a specific target point. Examples of the robot arm motion planning include operations such as picking up an object, assembling a component, or moving around an obstacle. This robot arm motion planning is an important operation that involves computing and optimizing a path for an improvement in efficiency, safety, and energy savings and at the same time avoiding a collision with an environment or a robot itself. In addition, a motion planning algorithm is required to ensure not only finding out a path along which the robot arm can move, but also smoothly generating a motion taking into consideration physical constraint conditions within a workspace for the robot. Simulating the motion planning refers to computation necessary to test and verify this complex motion in a digital environment before application to the real world.

The motion planning algorithm determines the direction in which each joint of the robot arm is required to move at every time step in order to start from a starting point and reach a target point, the angle at which it is required to do so, and the like. In the related art, a technique based on a nonlinear mathematical model is utilized to simulate the motion planning.

This technique has characteristics that result in multiple solutions. In this case, the technique has a limitation in outputting an optimal solution as deterministic.

In order to overcome this limitation, research has been conducted on motion planning through which to learn an optimal behavior using deep reinforcement learning. In this motion planning, a target point's location needs to change in every episode to enable the robot arm to reach multiple target points. To this end, target points having various levels of difficulty are randomly generated, and a deep reinforcement learning agent is enabled to perform learning for control of joints of the robot arm in order to enable the robot arm to reach the generated target points. However, in this case, the deep reinforcement learning agent does not interpret a cause-and-effect relationship for the level of difficulty between various target points randomly generated. Thus, a problem arises in that instability of learning occurs, thereby causing a decrease in the performance in motion planning.

In order to address the instability of learning of the cause-and-effect relationship for the level of difficulty, research has been conducted on curriculum learning that sequentially performs learning of tasks having similar levels of difficulty. However, in a case where this curriculum learning applies to the robot arm, there occurs catastrophic forgetting, a phenomenon where previously learned learning information (for example, learning of a target point having a low level of difficulty) is forgotten. Consequently, there occurs a problem in that the level of precision of the motion planning for the target point learned in the past is remarkably lowered.

SUMMARY

An object of the present disclosure is to provide an apparatus for and a method of simulating robot arm motion planning, the apparatus and the method being capable of providing improved operating characteristics.

According to embodiments of the present disclosure, there are provided an apparatus for and a method of simulating robot arm motion planning, the apparatus and the method being capable of improving a level of precision of motion planning and a computation speed by determining a curriculum for each relative level of difficulty and performing learning based on the determined curriculum.

The present disclosure is not limited to the above-mentioned object. Additional objects that are not mentioned will become apparent from the following description to a person of ordinary skill in the art.

Technical Solution

As an embodiment of the present disclosure, a method of simulating robot arm motion planning to which curriculum-based deep reinforcement learning applies may be provided.

The method according to an embodiment of the present disclosure may include: generating multiple features for each target point within a robot arm's work area; deciding on a selected feature based on correlations between the multiple features; determining a level of difficulty of the each target point based on the selected feature; determining a unit of curriculum (UoC), which is a group of the targets points, for which deep reinforcement learning is to be performed in the same episode, based on the determined level of difficulty; and performing sequentially the deep reinforcement learning for each of the units of curriculum.

The method according to an embodiment of the present disclosure, wherein, the determining of the level of difficulty of the each target point and the unit of curriculum may comprise: generating, as the same unit of curriculum, the group of the target points falling within a predefined range of similar levels of difficulty.

The method according to an embodiment of the present disclosure may further comprise: determining a level of curriculum (LoC) of each of the units of curriculum, wherein the sequential performing of the deep reinforcement learning for each of the units of curriculum may comprise: performing sequentially the deep reinforcement learning for each of the units of curriculum, depending on the determined level of curriculum.

The method according to an embodiment of the present disclosure, wherein, the selected features for determining the unit of curriculum include a feature of processing time taken to compute a motion to reach the target point, a feature of a distance from a current point of an end effector of the robot arm to the target point, and a feature of delta representing an amount of change in the sum of angles of joints of the robot arm, which is necessary for the robot arm to reach the target point.

The method according to an embodiment of the present disclosure, wherein, the determining of the level of difficulty of the each target point and the level of curriculum may comprise: plotting the target points on a three-dimensional graph with axes representing the feature of the processing time, the feature of the distance, and the feature of the delta, respectively; calculating a distance between a base point and a center point of each of the units of curriculum; and determining the level of curriculum of each of the units of curriculum based on the calculated distance, wherein the base point is a point at which the feature of the processing time, the feature of the distance, and the feature of the delta all have the lowest value.

The method according to an embodiment of the present disclosure, wherein, the sequential performing of the deep reinforcement learning for each of the units of curriculum may comprise: including previous transactions of the unit of curriculum, learned in the past, at a predefined replay ratio; and performing the deep reinforcement learning for a current unit of curriculum along with the previous transactions.

The method according to an embodiment of the present disclosure, wherein, the replay ratio is 20%.

The method according to an embodiment of the present disclosure, wherein, the sequential performing of the deep reinforcement learning for each of the units of curriculum may comprise: performing buffer flushing removing learning data on the unit of curriculum, learned in the past.

The method according to an embodiment of the present disclosure, wherein, in the performing of the buffer flushing, in a case where a result of learning the unit of curriculum, learned in the past, reaches or exceeds a predefined success ratio, the buffer flushing is performed.

BRIEF DESCRIPTION OF THE DRAWINGS

FIG. 4 is a table that is referred to describe multiple features associated with the target points in an exemplary manner.

DETAILED DESCRIPTION

Figure 1:
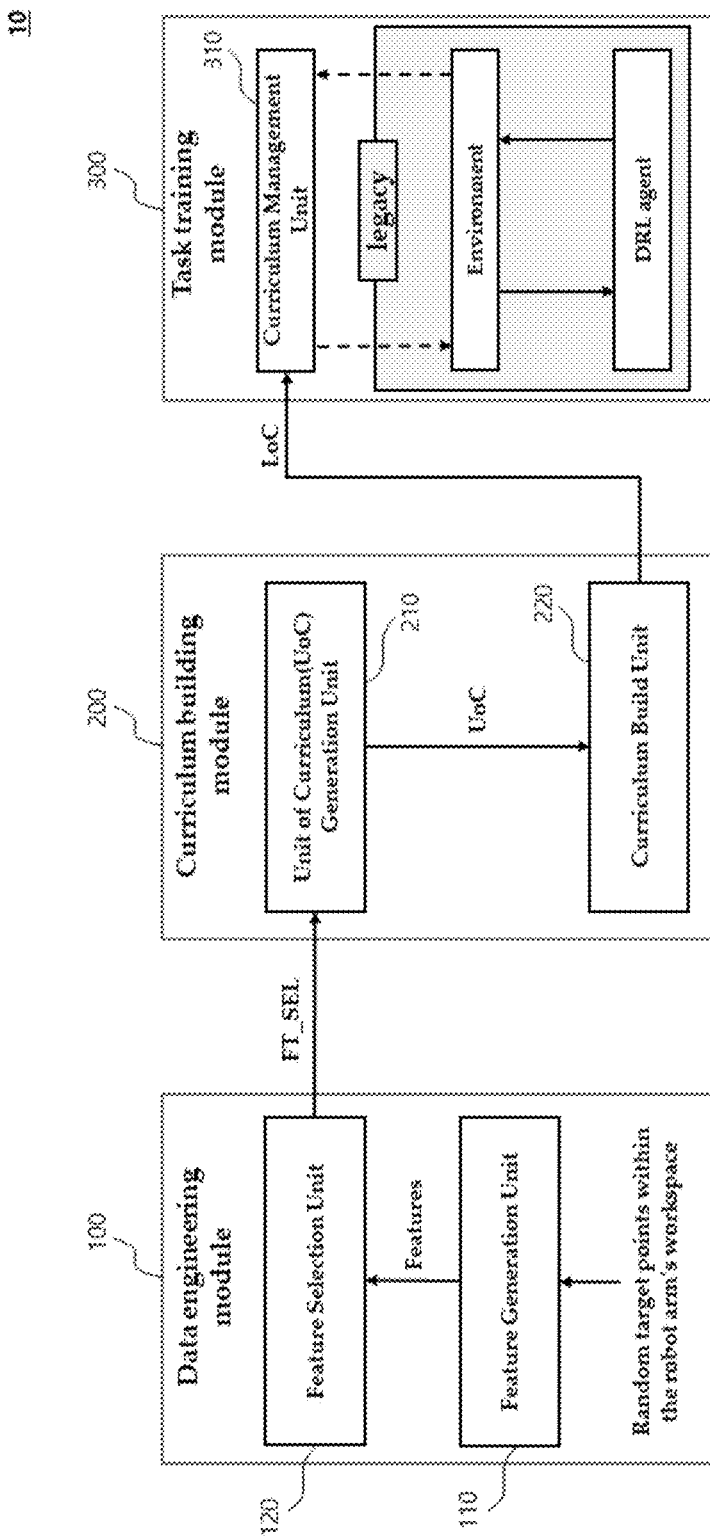
FIG. 1 is a block diagram that is referenced to describe the apparatus 10 for simulating robot arm motion planning according to several embodiments of the present disclosure.

Hereinafter, embodiments of the present invention will be described with reference to the drawings. In the following description, descriptions of a well-known technical configuration in relation to a lead implantation system for a deep brain stimulator will be omitted. For example, descriptions of the configuration/structure/method of a device or system commonly used in deep brain stimulation, such as the structure of an implantable pulse generator, a connection structure/method of the implantable pulse generator and a lead, and a process for transmitting and receiving electrical signals measured through the lead with an external device, will be omitted. Even if these descriptions are omitted, one of ordinary skill in the art will be able to easily understand the characteristic configuration of the present invention through the following description.

Robot arm motion planning refers to a process of determining the order and extent of motion that is required to be generated in order for a robot arm to reach a specific target point. Examples of the robot arm motion planning include operations such as picking up an object, assembling a component, or moving around an obstacle. This robot arm motion planning is an important operation that involves computing and optimizing a path for an improvement in efficiency, safety, and energy savings and at the same time avoiding a collision with an environment or a robot itself. In addition, a motion planning algorithm is required to ensure not only finding out a path along which the robot arm can move, but also smoothly generating a motion taking into consideration physical constraint conditions within a workspace for the robot. Simulating the motion planning refers to computation necessary to test and verify this complex motion in a digital environment before application to the real world.

The motion planning algorithm determines the direction in which each joint of the robot arm is required to move at every time step in order to start from a starting point and reach a target point, the angle at which it is required to do so, and the like. In the related art, a technique based on a nonlinear mathematical model is utilized to simulate the motion planning. This technique has characteristics that result in multiple solutions. In this case, the technique has a limitation in outputting an optimal solution as deterministic.

In order to overcome this limitation, research has been conducted on motion planning through which to learn an optimal behavior using deep reinforcement learning. In this motion planning, a target point's location needs to change in every episode to enable the robot arm to reach multiple target points. To this end, target points having various levels of difficulty are randomly generated, and a deep reinforcement learning agent is enabled to perform learning for control of joints of the robot arm in order to enable the robot arm to reach the generated target points. However, in this case, the deep reinforcement learning agent does not interpret a cause-and-effect relationship for the level of difficulty between various target points randomly generated. Thus, a problem arises in that instability of learning occurs, thereby causing a decrease in the performance in motion planning.

In order to address the instability of learning of the cause-and-effect relationship for the level of difficulty, research has been conducted on curriculum learning that sequentially performs learning of tasks having similar levels of difficulty. However, in a case where this curriculum learning applies to the robot arm, there occurs catastrophic forgetting, a phenomenon where previously learned learning information (for example, learning of a target point having a low level of difficulty) is forgotten. Consequently, there occurs a problem in that the level of precision of the motion planning for the target point learned in the past is remarkably lowered.

An apparatus 10 for and a method of simulating robot arm motion planning according to several embodiments of the present disclosure will be described below with reference to FIGS. 1 to 10.

Figure 2:
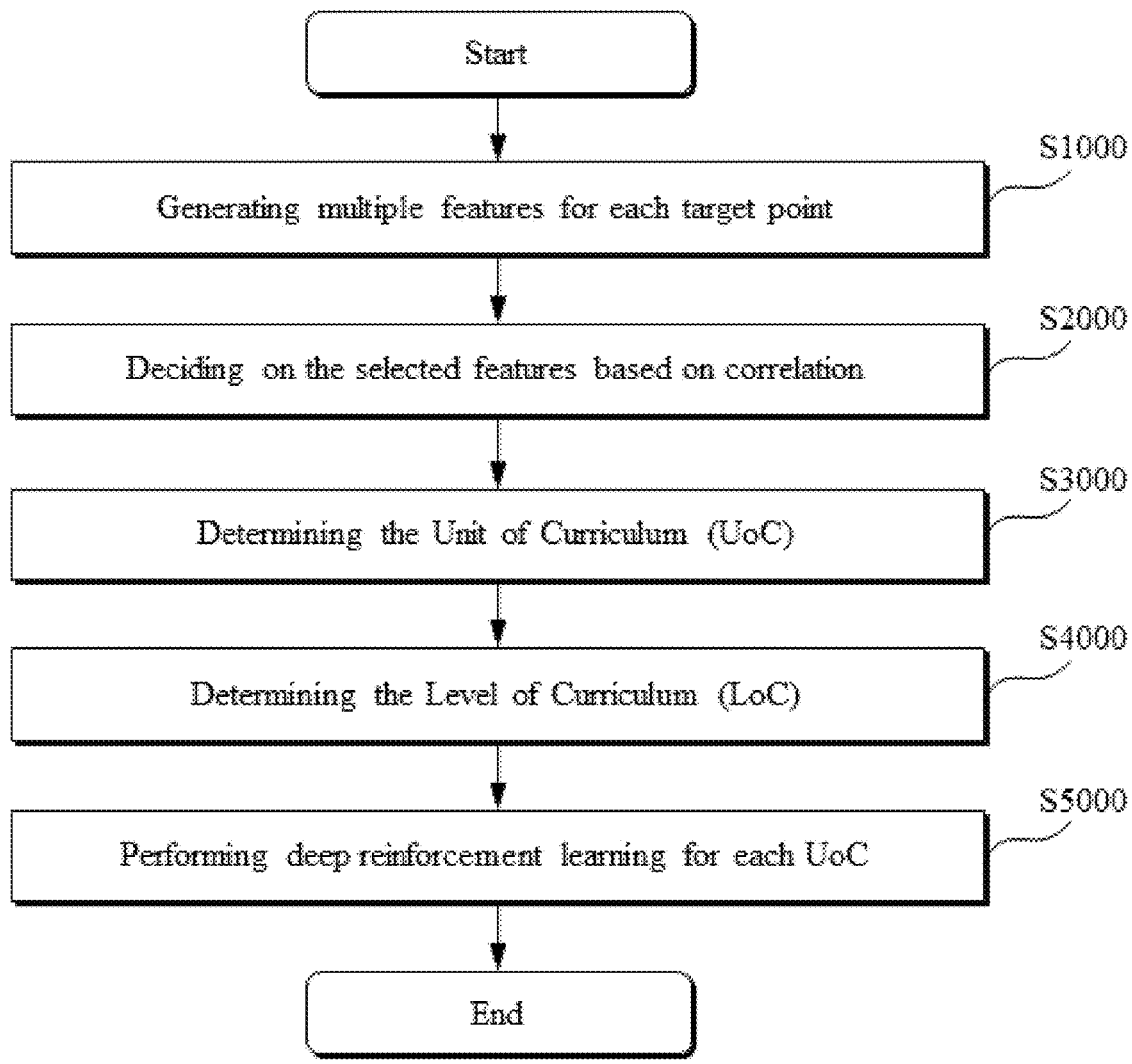
FIG. 2 is a flowchart that is referenced to describe the method of simulating robot arm motion planning according to several embodiments of the present disclosure.

FIG. 1 is a block diagram that is referenced to describe the apparatus 10 for simulating robot arm motion planning according to several embodiments of the present disclosure. FIG. 2 is a flowchart that is referenced to describe the method of simulating robot arm motion planning according to several embodiments of the present disclosure.

With reference to FIGS. 1 and 2, the apparatus 10 for simulating robot arm motion planning according to several embodiments of the present disclosure may include a data engineering module 100, a curriculum building module 200, and a task training module 300.

The data engineering module 100 may extract feature data for building a curriculum and may decide on a selected feature (FT_SEL) for determining a unit of curriculum (UoC). According to one embodiment of the present disclosure, the data engineering module 100 may include a feature generation unit 110 and a feature selection unit 120.

In Step S1000, the feature generation unit 110 may generate multiple feature data for each target point within a robot arm's work area. Multiple features may refer to feature data that have an influence on performing simulation of robot arm motion planning. For example, only for illustrative purposes, the multiple features may include a feature of computation time, a feature of a distance, a feature of delta, and the like. Of course, various other features may be generated that have an influence on performing the simulation of robot arm motion planning.

Figure 3:
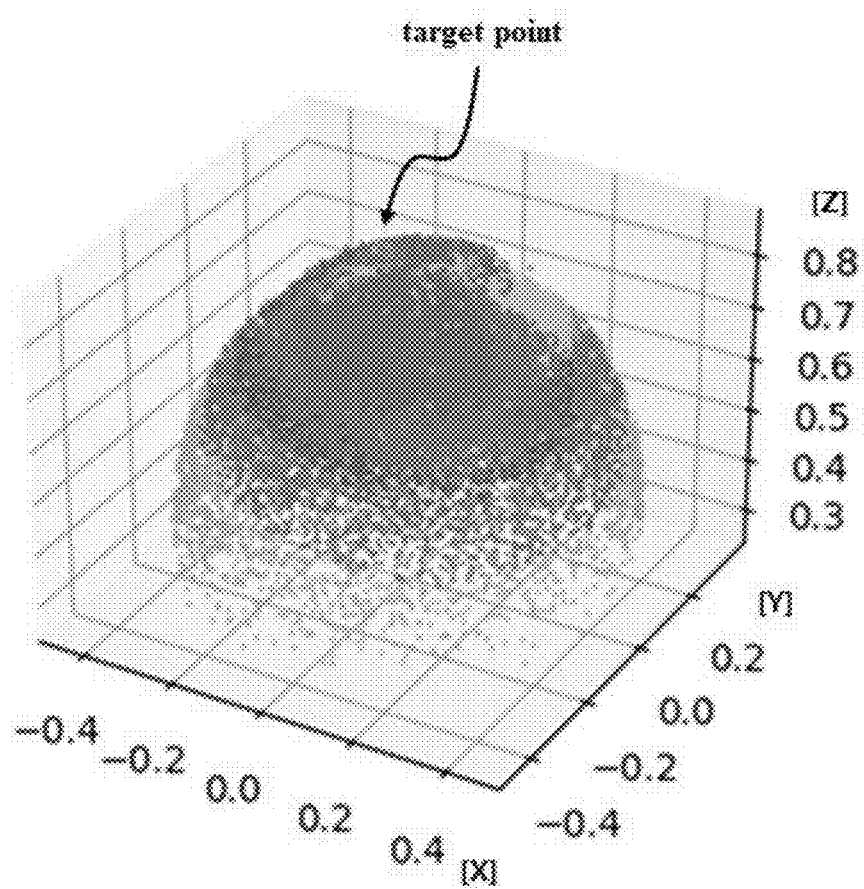
FIG. 3 is a graph that is referenced to describe target points for the robot arm in an exemplary manner.

FIG. 3 is a graph that is referenced to describe target points for the robot arm in an exemplary manner. FIG. 4 is a table that is referred to describe multiple features associated with the target points in an exemplary manner.

The feature generation unit 110 calculates the robot arm's workspace, taking into consideration constraint conditions for the robot arm (for example, the length of each link of the robot arm, angle limitations for each joint, and similar factors). As illustrated in FIG. 3, the feature generation unit 110 may randomly extract locations of points that the robot arm can reach. Subsequently, the feature generation unit 110 may calculate combinations of angles of the joints, which are necessary for the robot arm to reach the target points, and may derive feature data on the target points at the extracted locations on the basis of the results of the calculation. At this point, the combinations of the angles of the joints may be calculated using an inverse kinematics (IK) algorithm, but in an exemplary manner. Of course, these combinations may be calculated using other algorithms.

According to one embodiment of the present disclosure, as illustrated in FIG. 4, the multiple features may include three feature data. That is, the multiple features may include a feature of processing time (run_time) taken to compute a motion to reach a target point, a feature of a distance from a current point of the robot arm to the target point, and a feature of delta representing an amount of change in the sum of angles of joints of the robot arm, which is necessary for the robot arm to reach the target point. The feature of the processing time may refer to processing time taken to calculate a solution and may vary with constraint conditions (for example, links, joints, and the like) for the robot arm and with attributes of the target point. The feature of the distance may refer to a Euclidean distance from an end effector of the robot arm to the target point. Typically, the shorter the distance, the smaller the number of times the robot arm moves, and the longer the distance, the greater the number of times the robot arm moves. The feature of the distance may have a high correlation with a level of difficulty. The feature of the delta may refer to an amount of change in the sum of the joints, which is necessary for the robot arm to reach the target point. Typically, the less the amount of change in angle, the lower a level of difficulty of motion may be. However, according to cases, even though the distance is short, the feature of the delta may have a high value. That is, the feature of the distance and the feature of the delta are similar to each other, but may have complementary attributes.

In Step S2000, the feature selection unit 120 may decide on the selected feature (FT_SEL) based on correlations between multiple features. The feature selection unit 120 identifies and selects useful features through analysis of the correlations between the multiple features. That is, an unnecessary feature may be removed in such a manner that the unnecessary feature is not taken into consideration when a simulation model generates a curriculum. Accordingly, model dispersion may be reduced, and the curriculum may be generated in a more robust manner.

According to one embodiment of the present disclosure, the feature selection unit may generate a correlation matrix between the derived multiple features. The correlation matrix may have a value between −1 and to 1. It may be determined that the closer the absolute value is to 1, the higher correlations there are between the derived multiple features. For example, in a case where the correlation has a value of 0.8 or greater, it may be determined that the features in question have a high correlation.

Thus, a feature that has a higher correlation with other variables may be removed. The removal here may refer to non-selection as the selected feature (FT_SEL). In a case where a correlation value reaches or exceeds a predefined reference, computation may be performed in a redundant manner. Because of this, the efficiency of the computation can be improved by removing one feature from among the derived multiple features.

The curriculum building module 200 may determine a unit of curriculum (UoC) and a level of curriculum (LOC). The curriculum refers to a plan that is made up of learning contents of a specific subject domain and the order of learning in such a manner that a learner effectively learns. In the present specification, a curriculum unit may be expressed as a unit of curriculum (UoC), and the unit of curriculum (UoC) may refer to a group of target points that are similar in learning and a level of difficulty of control. As described below, the order of learning is determined according to a level of difficulty of the unit of curriculum (UoC).

According to several embodiments of the present disclosure, the curriculum building module 200 may automatically generate units of curriculum (UoCs) for various points within the robot arm's workspace and may determine the relative order of the generated units of curriculum (UoC). According to one embodiment of the present disclosure, the curriculum building module 200 may include a unit-of-curriculum generation unit 210 and a curriculum build unit 220.

Figure 5:
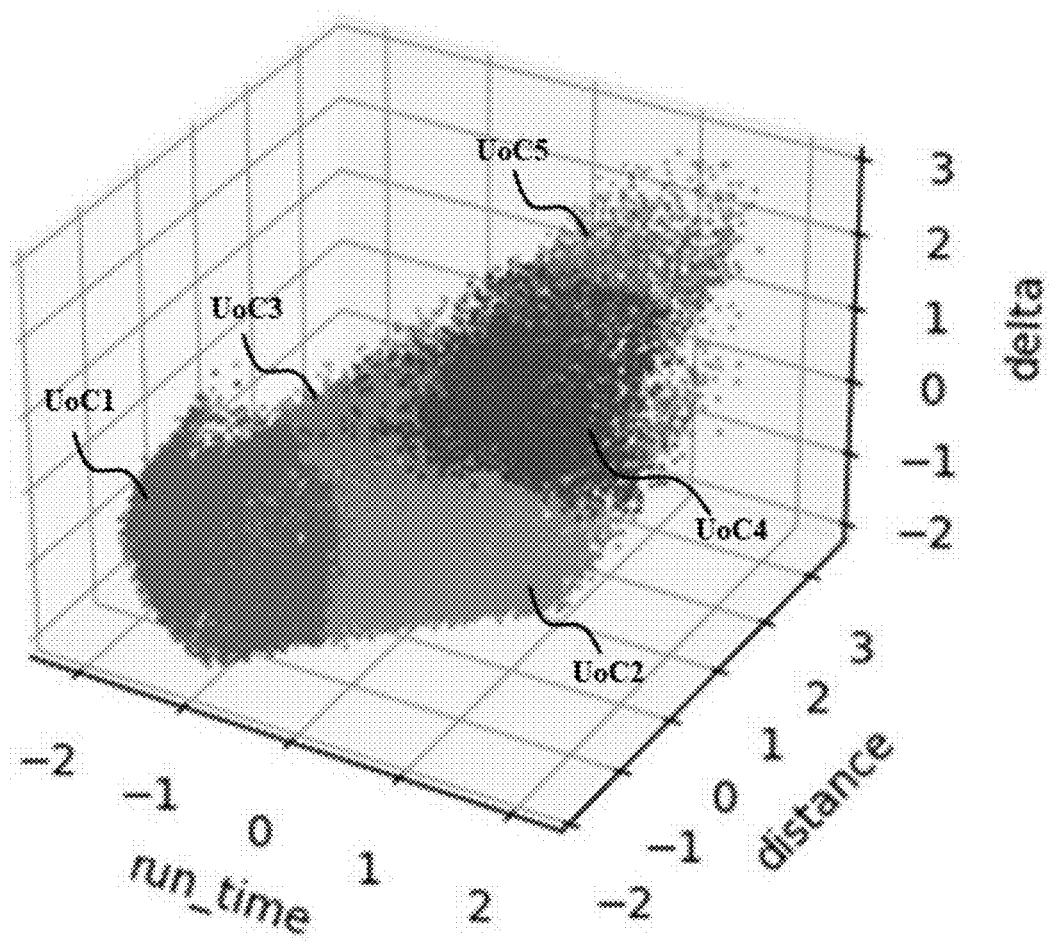
FIG. 5 is a graph that is referenced to describe the unit of curriculum (UoC) generated based on a clustering algorithm in an exemplary manner.

FIG. 5 is a graph that is referenced to describe the unit of curriculum (UoC) generated based on a clustering algorithm in an exemplary manner.

In Step S3000, the unit-of-curriculum generation unit 210 may determine the unit of curriculum (UoC), which is a group of target points, for which deep reinforcement learning is to be performed in the same episode, based on the selected feature (FT_SEL). Five groups of target points may be determined as units of curriculum (UoC1 to UoC5) in an exemplary manner.

In FIG. 5, it is illustrated that three selected features (FT_SEL) are used in an exemplary manner. Target points are plotted on a graph, with axes of the graph representing selective features (FT_SEL), respectively. In order to perform clustering based on the selected feature (FT_SEL), the unit-of-curriculum generation unit 210 may generate a candidate group of units of curriculum (UoCs) by utilizing an unsupervised learning algorithm. Subsequently, in order to select an optimal unit of curriculum (UoC) from the candidate group of units of curriculum (UoCs), the optimal unit of curriculum (UoC) may be verified by applying an algorithm for evaluating the quality of the result of the clustering. Subsequently, the optimal candidate may be determined as the unit of curriculum (UoC). For example, an algorithm for evaluating quality may utilize Silhouette, Calinski-Harabasz, and Davies-Boudin indexes, but in an exemplary manner. Various evaluation algorithms may apply to the present disclosure.

Figure 6:
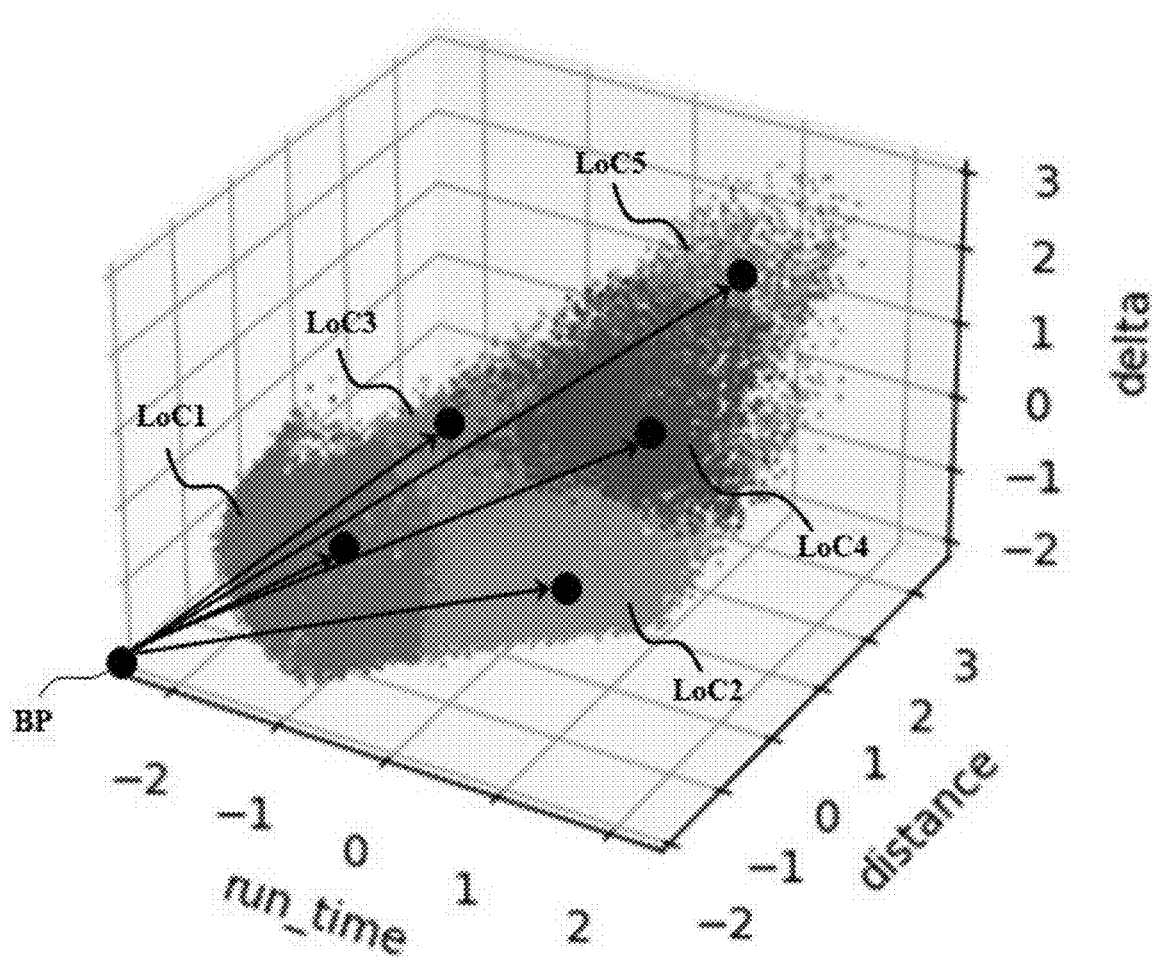
FIG. 6 is a graph that is referenced to describe an operation of determining the level of curriculum (LOC) in an exemplary manner according to the relative level of difficulty between units of curriculum (LoCs).

FIG. 6 is a graph that is referenced to describe an operation of determining the level of curriculum (LOC) in an exemplary manner according to the relative level of difficulty between units of curriculum (LoCs).

In Step S4000, the curriculum build unit 220 may determine a level of curriculum (LoC) of each unit of curriculum (UoC). The level of curriculum LOC may refer to the level of difficulty that corresponds to each unit of curriculum (UoC). For example, five units of curriculum UoC1 to UoC5 may correspond to different levels of curriculum LoC1 to LoC5, respectively. The level of curriculum (LoC1) may be a level applying to a unit of curriculum (UoC) that has the lowest level of difficulty, and the level of curriculum (LoC5) may be a level applying to a unit of curriculum (UoC) that has the highest level of difficulty.

According to several embodiments of the present disclosure, the curriculum build unit 220 may plot target points on a graph, with axes of the graph representing multiple selected features (FT_SEL), respectively. Additionally, the curriculum build unit 220 may calculate a distance between a base point BP and a center point of each unit of curriculum (UoC). Additionally, the curriculum build unit 220 may determine the level of curriculum (LoC) of each unit of curriculum (UoC) based on the calculated distance. At this point, the base point BP may be defined as a point at which multiple selected features (FT_SEL) all have the lowest value.

That is, the level of curriculum (LOC) may refer to the relative order of learning of the generated unit of curriculum (UoC). As illustrated in FIG. 5, each unit of curriculum (UoC) is in a state where whether it has the relatively high or low level of difficulty cannot be identified. The base point BP may be designated to determine the relative level of difficulty. Then, a Euclidean distance between of the base point BP and the center point of each unit of curriculum (UoC) may be calculated. As illustrated in FIG. 6, a level of curriculum (LoC) corresponding to each unit of curriculum (UoC) may be determined according to the calculated distance. According to one embodiment of the present disclosure, a unit of curriculum (UoC) having a short distance to the base point BP is evaluated as having a low level of difficulty, and a unit of curriculum (UoC) having a relatively long distance to the base point BP is evaluated as having a high level of difficulty. In this manner, a level of curriculum (LOC) of each unit of curriculum (UoC) may be determined. Therefore, in a case where N units of curriculum (UoCs) are defined, N levels of curriculum (LoCs) that correspond the N units of curriculum (UoCs), respectively, may be defined.

Figure 7:
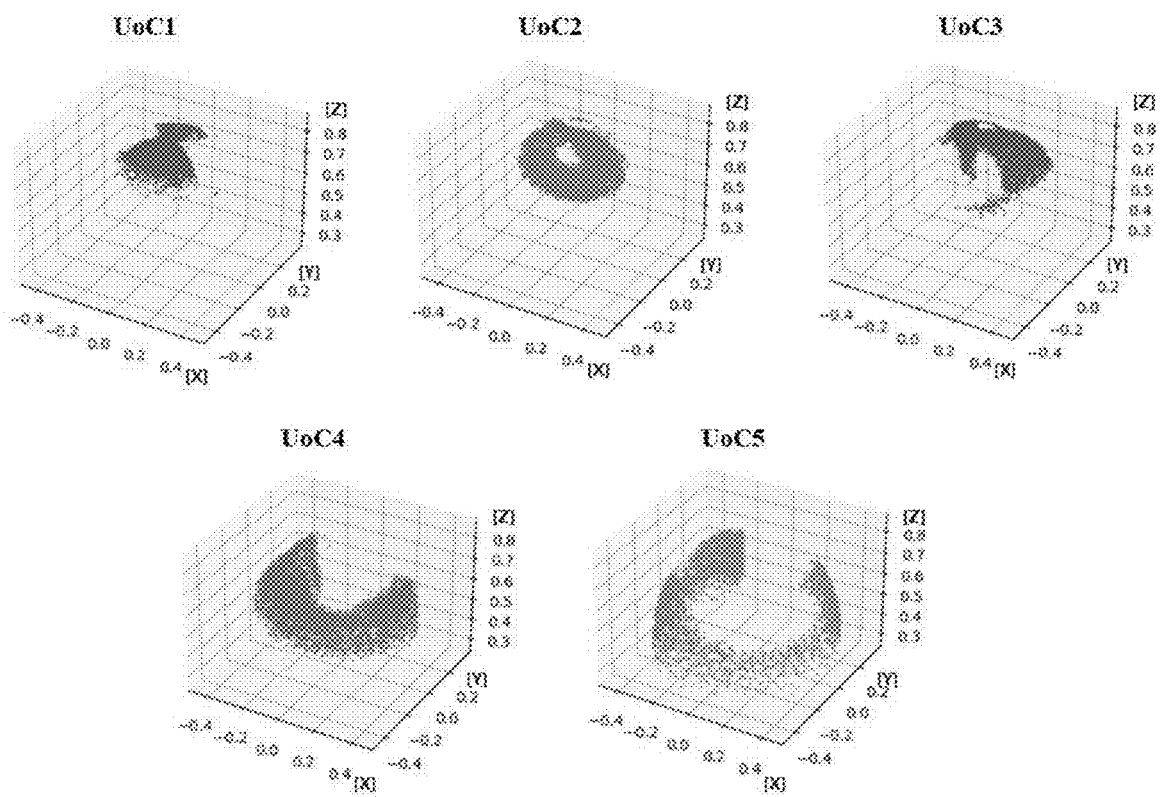
FIGS. 7 and 8 are graphs that are referenced to describe target points, included in a unit of curriculum (UoC), in an exemplary manner.
Figure 8:
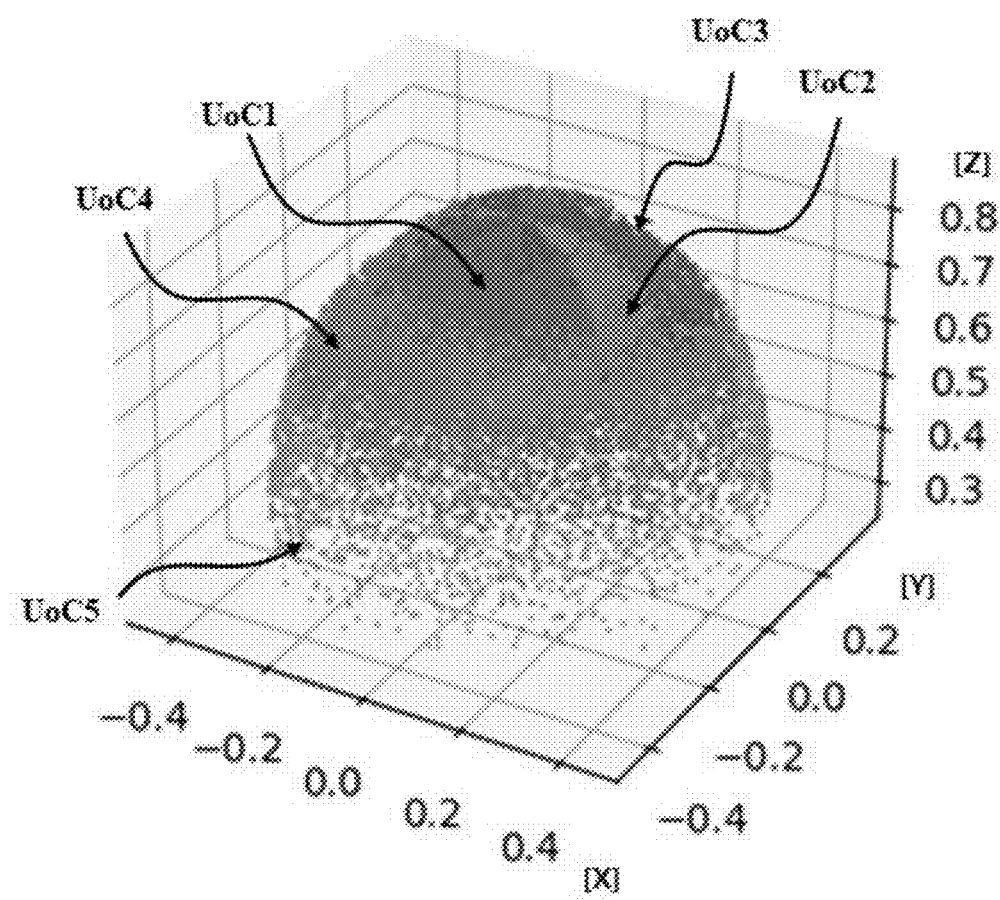

FIGS. 7 and 8 are graphs that are referenced to describe target points, included in a unit of curriculum (UoC), in an exemplary manner.

With reference to FIGS. 7 and 8, typically, target points included in the same unit of curriculum (UoC) may be points that have similar physical locations. However, points that have relative locations not adjacent to each other may be included in the same unit of curriculum (UoC) according to the number of times the joint moves, an angle of the joint, and other factors.

The curriculum that is established according to several embodiments of the present disclosure may systematically define a space to be searched during motion planning deep reinforcement learning for the target points within the workspace. A learning goal and a level of difficulty are clearly defined in the level of difficulty, which applies to each unit of curriculum (UoC), that is, in the level of curriculum (LOC). Accordingly, an agent can accurately understand the context of the curriculum. That is, the defined level of curriculum can improve the level of understanding of an objective function of a learning agent that controls learning of motion planning.

The task training module 300 is a training module designed to optimize the learning by a deep reinforcement learning agent. According to one embodiment of the present disclosure, the task training module 300 may include a curriculum management unit 310.

In Step S5000, the task training module 300 may perform the deep reinforcement learning for each unit of curriculum (UoC) according to a level of curriculum (LOC).

Figure 9:
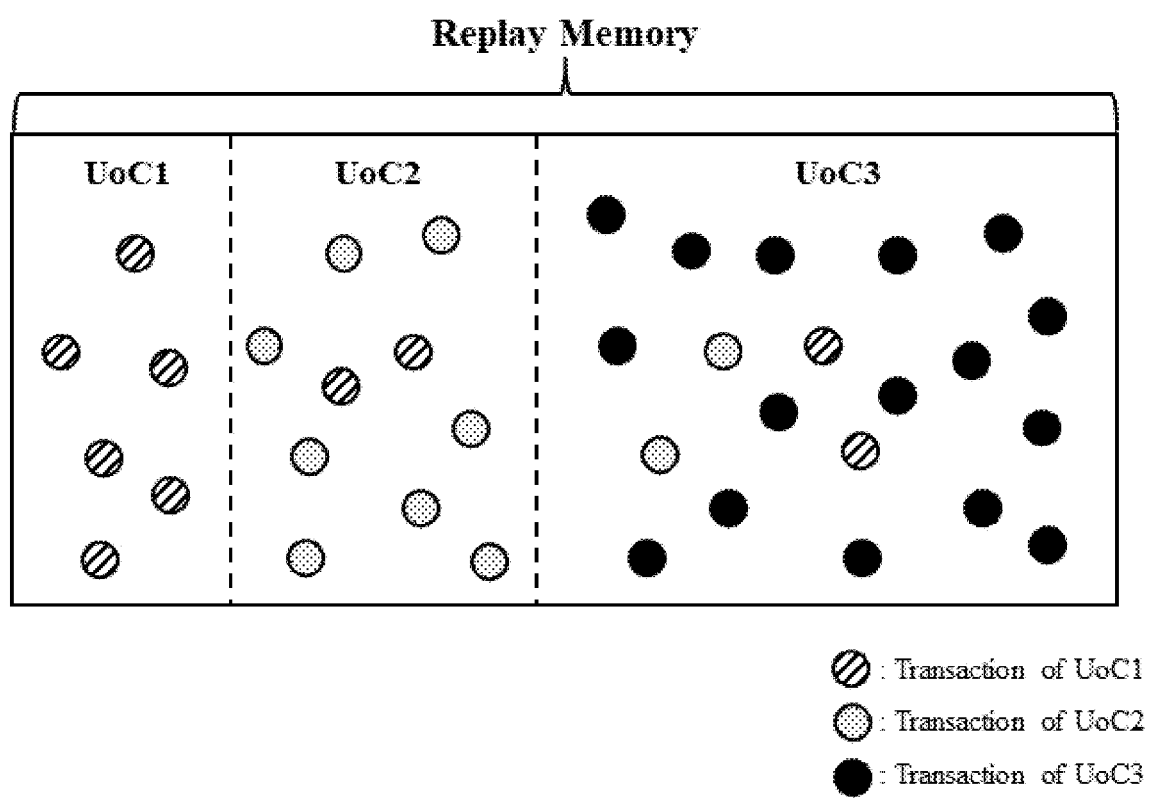
FIG. 9 is a diagram that is referenced to describe a robot arm motion planning simulation operation to which experiment replay in accordance with a predefined replay ratio applies.

FIG. 9 is a diagram that is referenced to describe a robot arm motion planning simulation operation to which experiment replay in accordance with a predefined replay ratio applies.

With reference to FIG. 9, according to several embodiments of the present disclosure, the task training module 300 may sequentially perform learning of units of curriculum (UoCs), depending on a determined level of curriculum (LoC), that is, the level of difficulty. According to one embodiment of the present disclosure, the unit of curriculum (UoC1) having a low level of difficulty may be first learned, and then the unit of curriculum (UoC2) and the unit of curriculum (UoC3) may be learned in the order of decreasing the level of difficulty.

According to several embodiments of the present disclosure, the task training module 300 may include previous transactions of the unit of curriculum (UoC), learned in the past, at a predefined replay ratio, and may perform learning of a current unit of curriculum (UoC) along with the previous transactions.

For example, in a case where the replay ratio is 20%, the unit of curriculum (UoC2) may be learned along with 20% of the learning transactions of the unit of curriculum (UoC1). In addition, the unit of curriculum (UoC3) may be learned along with 20% of the learning transactions of the units of curriculum (UoC1 and UoC2). That is, the experience replay or a review mechanism may apply during a deep reinforcement learning process.

Typically, the result is output that indicates that learning for a target point having a high level of difficulty has a relatively low success ratio, while learning for a target point having a low level of difficulty has a high success ratio. In addition, in a case where the replay ratio is excessively increased during the experience replay, current learning may have a decreased success ratio while the learning performed in the past for the target point having a low level of difficulty has an increased success ratio. Accordingly, according to the present disclosure, a suitable replay ratio may apply (for example, 20%) in order to increase a success ratio of a current learning point, that is, of a unit of curriculum (UoC) having a high level of difficulty while maintaining a high success ratio of a learning point in the past, that is, of a unit of curriculum (UoC) having a low level of difficulty. Of course, this replay ratio may be realized by a change to an optimal ratio that varies with a current location of the robot arm, a structure of the joint, a structure of the link, the result of learning in the past, and other factors.

According to one embodiment of the present disclosure, since the review of the learning of the learning transactions in the past is performed, a balance can be ensured between the result of the learning in the past and the integration of new contents. Accordingly, a problem of catastrophic forgetting can be addressed. That is, new contents can be effectively learned while the contents in the past are periodically learned. Accordingly, the performance of the agent can be maintained and improved during a long-term learning process.

Figure 10:
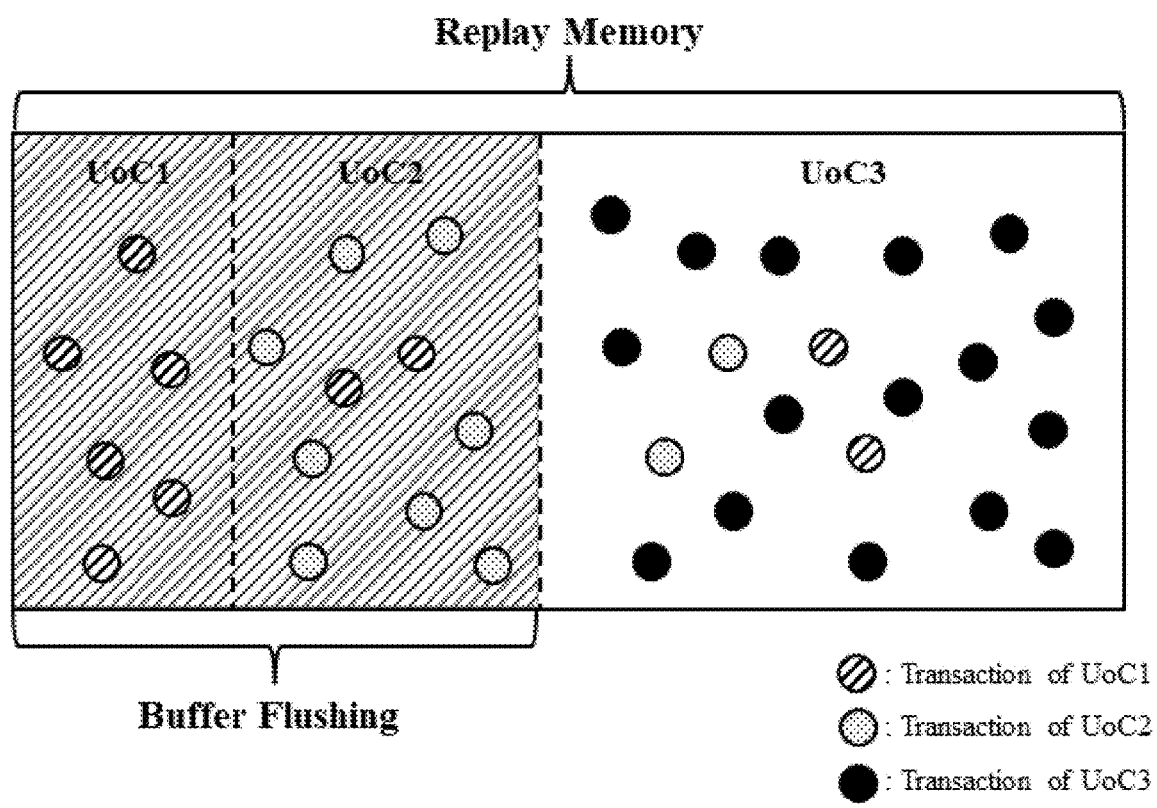
FIG. 10 is a diagram that is referenced to describe an operation of simulating the robot arm motion planning, to which buffer flushing applies.

FIG. 10 is a diagram that is referenced to describe an operation of simulating the robot arm motion planning, to which buffer flushing applies.

With reference to FIG. 10, the task training module 300 according to several embodiments of the present disclosure may perform buffer flushing that removes learning data on the unit of curriculum (UoC) learned in the past. Accordingly, replay memory is evacuated in such a manner that the learning data learned in the past that have a level of difficulty can be prevented from being excessively accumulated and that new data having a level of difficulty can be concentrated. As a result, the agent can be assisted in effectively performing learning in accordance with a recent level of curriculum (LOC).

The catastrophic forgetting can be minimized by relearning the previous transactions at a predefined replay ratio (for example, 20%) through application of the experience replay. Thus, the removal of previous learning memory does not have an influence on the performance of learning. Furthermore, the learning time can be shortened.

According to several embodiments of the present disclosure, in a case where the result of learning the unit of curriculum (UoC) learned in the past has a success ratio that reaches or exceeds a predefined success ratio, the buffering flushing can be performed. That is, a success ratio in accordance with a predefined reference is calculated from the transactions learned in the past, and, in a case where the success ratio reaches or exceeds a reference, the buffer flushing is performed. Thus, a relearning ratio of the unit of curriculum (UoC) having a success ratio can be increased, and unnecessary redundant learning of a unit of curriculum (UoC) having a high success ratio can be minimized through the buffer flushing.

The curriculum management unit 310 interacts with an environment during a learning process and sets a learning target point based on a unit of curriculum (UoC) corresponding to a current level of curriculum (LOC). Furthermore, the curriculum management unit 310 assists the agent in being adaptable to a curriculum by a change to a learning target at a target point of another unit of curriculum (UoC) at an ending point in time for an episode of each unit of curriculum (UoC).

The curriculum management unit 310 raises a level of curriculum (LoC) when successfully finishing learning a current unit of curriculum (UoC). Accordingly, the agent can perform more challenging learning based on the previously acquired knowledge, thereby improving the learning capability of the agent. According to the present disclosure, correct and stable learning of motion planning in a complex search space in which a multiplicity of learning targets are present can be performed.

The embodiments described above may be implemented by hardware components, software components, and/or any combination thereof. For example, the devices, the methods, and components described in the embodiments may be implemented by using general-purpose computers or special-purpose computers, such as a processor, a controller, an arithmetic logic unit (ALU), a digital signal processor, a microcomputer, a field programmable gate array (FPGA), a programmable logic unit (PLU), a microprocessor, or any other devices which may execute and respond to instructions. A processing apparatus may execute an operating system (OS) and a software application executed in the OS. Also, the processing apparatus may access, store, operate, process, and generate data in response to the execution of software. For convenience of understanding, it may be described that one processing apparatus is used. However, one of ordinary skill in the art will understand that the processing apparatus may include a plurality of processing elements and/or various types of processing elements. For example, the processing apparatus may include a plurality of processors or a controller. Also, other processing a processor and configurations, such as a parallel processor, are also possible.

The software may include computer programs, code, instructions, or any combination thereof, and may construct the processing apparatus for desired operations or may independently or collectively command the processing apparatus. In order to be interpreted by the processing apparatus or to provide commands or data to the processing apparatus, the software and/or data may be permanently or temporarily embodied in any types of machines, components, physical devices, virtual equipment, computer storage mediums, or transmitted signal The software may be distributed over network coupled computer systems so that it may be stored and executed in a distributed fashion. The software and/or data may be recorded in a computer-readable recording medium.

A method according to an embodiment may be implemented as program instructions that can be executed by various computer devices, and recorded on a computer-readable recording medium. The computer-readable recording medium may include program instructions, data files, data structures or a combination thereof. Program instructions recorded on the medium may be particularly designed and structured for embodiments or available to one of ordinary skill in a field of computer software. Examples of the computer-readable recording medium include magnetic media, such as a hard disc, a floppy disc, and magnetic tape; optical media, such as a compact disc-read only memory (CD-ROM) and a digital versatile disc (DVD); magneto-optical media, such as floptical discs; and hardware devices specially configured to store and execute program instructions, such as ROM, random-access memory (RAM), a flash memory, etc. Program instructions may include, for example, high-level language code that can be executed by a computer using an interpreter, as well as machine language code made by a complier.

In concluding the detailed description, those skilled in the art will appreciate that many variations and modifications may be made to the preferred embodiments without substantially departing from the principles of the present invention. Therefore, the disclosed preferred embodiments of the invention are used in a generic and descriptive sense only and not for purposes of limitation.

What is claimed is:

1. A method of simulating robot arm motion planning to which curriculum-based deep reinforcement learning applies, the method comprising:
    generating multiple features for each target point within a robot arm's work area;
    deciding on a selected feature based on correlations between the multiple features;
    determining a level of difficulty of the each target point based on the selected feature and a unit of curriculum (UoC), which is a group of the target points, for which deep reinforcement learning is to be performed in the same episode, based on the determined level of difficulty; and
    performing sequentially the deep reinforcement learning for each of the units of curriculum.

2. The method of claim 1, wherein the determining of the level of difficulty of the each target point and the unit of curriculum comprises:
    generating, as the same unit of curriculum, the group of the target points falling within a predefined range of similar levels of difficulty.

3. The method of claim 1, further comprising:
    determining a level of curriculum (LOC) of each of the units of curriculum,
    wherein the sequential performing of the deep reinforcement learning for each of the units of curriculum comprises:
        performing sequentially the deep reinforcement learning for each of the units of curriculum, depending on the determined level of curriculum.

4. The method of claim 3, wherein the selected features for determining the unit of curriculum include a feature of processing time taken to compute a motion to reach the target point, a feature of a distance from a current point of an end effector of the robot arm to the target point, and a feature of delta representing an amount of change in the sum of angles of joints of the robot arm, which is necessary for the robot arm to reach the target point.

5. The method of claim 4, wherein the determining of the level of difficulty of the each target point and the level of curriculum comprises:
    plotting the target points on a three-dimensional graph with axes representing the feature of the processing time, the feature of the distance, and the feature of the delta, respectively;
    calculating a distance between a base point and a center point of each of the units of curriculum; and
    determining the level of curriculum of each of the units of curriculum based on the calculated distance,
    wherein the base point is a point at which the feature of the processing time, the feature of the distance, and the feature of the delta all have the lowest value.

6. The method of claim 3, wherein the sequential performing of the deep reinforcement learning for each of the units of curriculum comprises:
    including previous transactions of the unit of curriculum, learned in the past, at a predefined replay ratio; and
    performing the deep reinforcement learning for a current unit of curriculum along with the previous transactions.

7. The method of claim 6, wherein the replay ratio is 20%.

8. The method of claim 6, wherein the sequential performing of the deep reinforcement learning for each of the units of curriculum comprises,
    performing buffer flushing removing learning data on the unit of curriculum, learned in the past.

9. The method of claim 8, wherein, in the performing of the buffer flushing, in a case where a result of learning the unit of curriculum, learned in the past, reaches or exceeds a predefined success ratio, the buffer flushing is performed.

* * * * *